No. 788,510.

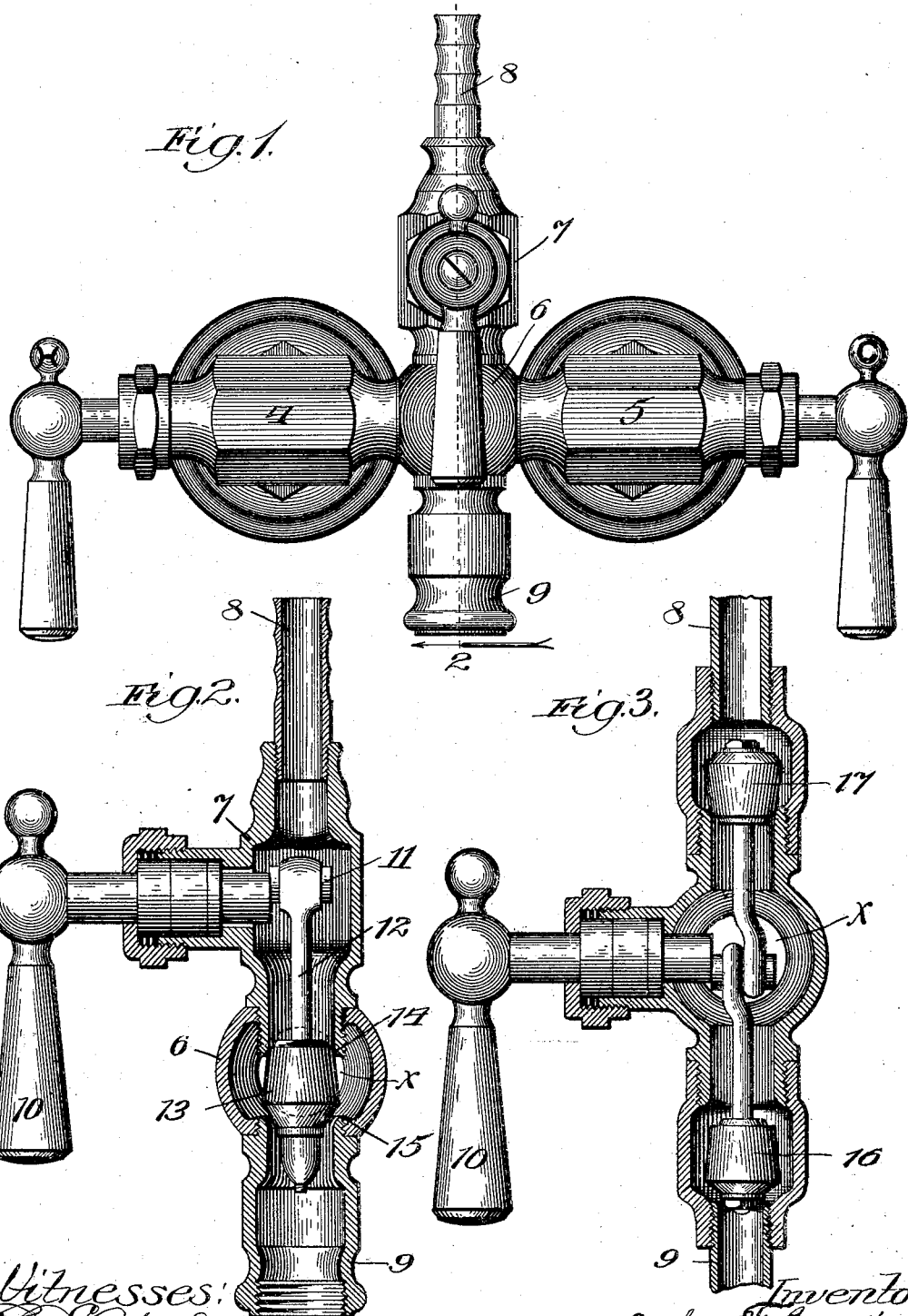

Patented May 2, 1905.

UNITED STATES PATENT OFFICE.

ASAHEL F. BENNETT, OF OAK PARK, ILLINOIS, ASSIGNOR TO CRANE COMPANY, OF CHICAGO, ILLINOIS, A CORPORATION OF ILLINOIS.

VALVE.

SPECIFICATION forming part of Letters Patent No. 788,510, dated May 2, 1905.

Application filed April 21, 1903. Serial No. 153,591.

*To all whom it may concern:*

Be it known that I, ASAHEL F. BENNETT, a citizen of the United States, residing at Oak Park, in the State of Illinois, have invented certain new and useful Improvements in Valves, of which the following is a specification.

This invention has reference particularly to combination valves such as are commonly used in connection with bath-tubs or other toilet-room fixtures, for controlling the flow of the hot and cold water and regulating the temperature of the mixture thereof.

The first of the objects of this invention is the provision of a device of the type specified, in conjunction with which there is provided means whereby the mixture of hot and cold water may be caused to flow in either one of two directions at will, so that the temperature thereof may be determined by feeling the water as it flows in one direction, or out of one outlet nozzle, adjusting the hot and cold water valves so as to get just the temperature desired, and then by the shifting of the supplemental valve the mixture of hot and cold water may be caused to flow through another passage or outlet which would ordinarily be connected to some shower-bath device, such as the common form of hose with sprinkler nozzle attached.

Another object of this invention is the provision of a combination valve device in which there is combined with the hot and cold water valves a supplemental valve device arranged to control the mixture of the hot and cold water and to determine the flow thereof relative to a plurality of outlet openings or passages.

The above, as well as such other objects as will hereinafter appear, I attain by means of a construction which I have illustrated in preferred form in the accompanying drawing, in which—

Figure 1 is an end elevation of a valvular device embodying my improvements.

Figure 2 is a section on the line 2 in Figure 1; and Figure 3 represents a modification showing a somewhat different form of supplemental valve mechanism.

Referring particularly to Figure 1, it will be seen that I have therein indicated the exterior of a hot water valve 4, and a cold water valve 5, which as they may be of any ordinary construction, are not indicated in detail, but only as it were diagrammatically, the connections from said hot and cold water valves joining within the part marked 6, which contains a mixing chamber $x$. The mixing chamber $x$ has two outlets, opening respectively past the valve seats 14 and 15, (see Fig. 2), both of said valve seats being subject to control alternately by means of the valve 13, which is actuated by the handle 10, through the crank 11, and connection 12, which parts combined constitute what for convenience of reference I shall term generally "the supplemental valve device." The water that flows past the seat 14, passes upward through the casing 7, and out through the nozzle 8, the said nozzle being preferably constructed for attachment to the usual form of hose and sprinkler head commonly used for shower-bath purposes; and the water that passes the valve seat 15 has its outlet through the downwardly projecting nozzle 9.

It will be observed that with the parts in the position shown, the seat leading to the nozzle 8 is closed, while that leading to the nozzle 9 is open. If now water be admitted from the hot water valve 4, and the cold water valve 5, the same being adjusted to just the right relative positions as will cause the mixture of the two passing from the mixing chamber $x$ out of the nozzle 9, to be at the desired temperature, a reversal of the position of the handle 10 will shut off the flow to the nozzle 9, and cause the water to flow upwardly through the nozzle 8, to the shower-bath arrangement attached thereto. It will further be observed that the quantity of the water passing upward through the nozzle 8 can be regulated to any extent desired by proper setting of the handle 10, without altering the temperature of the mixture after the same has been once properly fixed; for the water that does not flow upward from the chamber $x$ with the valve 13 in an intermediate position, will escape downward through the nozzle 9.

In Figure 3 I have shown a modification in which the outlets leading upward and downward from the mixing chamber $x$, while both controlled by the single handle 10, are each provided with a separate closing valve, 16 and 17, both of which are capable of closing either one of the outlets from the valve chamber, so that both outlets from the main chamber may be closed at once whether the two valves are forced upward or forced downward. It will be noted that the valve plugs have on the inner side a long slanting face and on the outer surface a more abruptly slanting face. Thus as shown in this figure, the two valves may be pushed farther down, forcing the upper valve farther into its inner seat, until the lower valve is seated on its outer surface which will entirely close off the flow.

While the drawings show what is known as the Fuller bib cock form of valve construction, my improvement is not limited to the employment of any particular form of valve, as ground plug cocks, or any other known construction, may be used when preferred. And though I have referred to the employment of my improvement in conjunction with the common hose with sprinkler nozzle attached, it is obvious that it is capable of use with any other form of shower bath devices in general use, such as those attached to the wall and suitably connected to the bath cock.

Having thus described my invention and illustrated its use in preferred form in the accompanying drawings, what I claim, and desire to secure by Letters Patent, is the following:

1. In a valve the combination of a casing having two valve controlled inlets, and two outlets, a double valve located between said two outlets in the casing, having a face seating upon each of the outlets, in alternation one face being an elongated cone, a crank shaft mounted in the casing and a link supporting the double valve and operated by said crank-shaft, whereby the valve is moved between the two outlets to close either one of them, and differentially governs the outflow from the casing, and the valve stem may have further movement after the long cone face is seated, substantially as described.

2. The combination with a casing having two valve-controlled inlets and two valve-controlled outlets, of a valve device in said casing and means for entirely closing either one of said outlets or both of said outlets simultaneously, substantially as described.

3. The combination with a casing having two valve-controlled inlets and two valve-controlled outlets, of a valve device in said casing provided with two valves which move simultaneously and are provided each with two seats and adapted to close either one of said outlets or both of said outlets together and to move differentially with respect to said outlets, substantially as described.

4. A valve device comprising a casing with four valve seats in pairs each of which comprises two seats facing each other, a valve between each of said two pairs of seats and means for moving the two valves simultaneously so as to close the pairs of seats in either direction simultaneously or to open them differentially, substantially as described.

5. In a valve the combination with a casing having two valve-controlled inlets, and two outlets having each a valve chamber therein provided with two seats, of a pair of valves, one in each of the outlet chambers each provided with two conical surfaces one of which is of greater inclination than the other, whereby the valve may move further into its seat in one direction than in the other, and means for moving said outlet valves simultaneously in either direction to co-operate respectively with either one of the seats in said chambers.

In testimony whereof I have hereunto set my hand in the presence of the subscribed witnesses.

ASAHEL F. BENNETT.

Witnesses:
H. M. HALDEMAN,
EDWARD C. BURNS.